United States Patent [19]
Dushenko et al.

[11] Patent Number: 4,570,806
[45] Date of Patent: Feb. 18, 1986

[54] TOTE PAN AND WAREHOUSE RACK STRUCTURE THEREFOR

[75] Inventors: Michael D. Dushenko, Macedon, N.Y.; Harvey R. Castner, New Berlin, Wis.; Robert T. Baugh, Brookfield, Wis.; Paul T. Shupert, Milwaukee, Wis.

[73] Assignee: Allis-Chalmers Corporation, Milwaukee, Wis.

[21] Appl. No.: 499,463

[22] Filed: May 31, 1983

[51] Int. Cl.$^4$ .................................................. A47F 5/00
[52] U.S. Cl. .................................... 211/191; 206/557; 211/126
[58] Field of Search ............... 211/190, 191, 189, 183, 211/126, 151, 193; 108/52.1, 53.3; 206/557, 505, 506

[56] References Cited

U.S. PATENT DOCUMENTS

| | | | |
|---|---|---|---|
| 2,894,641 | 7/1959 | Edwards | 211/134 |
| 2,971,658 | 2/1961 | D'Altrui | 211/193 |
| 3,376,046 | 4/1968 | Kivett et al. | 206/506 X |
| 3,448,870 | 6/1969 | Gallo et al. | |
| 3,464,832 | 9/1969 | Mullinix | 206/557 |
| 3,525,442 | 8/1970 | Novales | 211/193 |
| 3,721,349 | 3/1973 | Jaffee et al. | 280/79.3 X |
| 3,809,259 | 5/1974 | Pipes | |
| 3,883,008 | 5/1975 | Castaldi | |
| 3,918,600 | 11/1975 | Lyon | 206/509 X |
| 4,010,855 | 3/1977 | Smith | |

FOREIGN PATENT DOCUMENTS

651267 2/1929 France ............................ 211/126

Primary Examiner—Robert W. Gibson, Jr.
Attorney, Agent, or Firm—Charles L. Schwab; Timothy R. Conrad; Arthur M. Streich

[57] ABSTRACT

A warehouse system employs a crane guided for movement along an aisle with storage racks on opposite sides thereof and mounting a carriage for vertical reciprocation thereon. An extractor supported on the carriage has a pair of narrow extensible arms which engage the undersides of lips formed on opposite sides of a tote pan. The extensible arms each include three rails nested in one-above-the-other relation with the intermediate rail having vertical load bearing rollers engaging the upper and lower rails. A harmonic drive causes extension and retraction of the extractor arms through a chain and pulley arrangement. The tote pans are nestable and have ribbed bottoms cooperatively engaging cantilevered brackets on the storage racks whereby the pans are releasably detained in their stored position in the warehouse.

9 Claims, 20 Drawing Figures

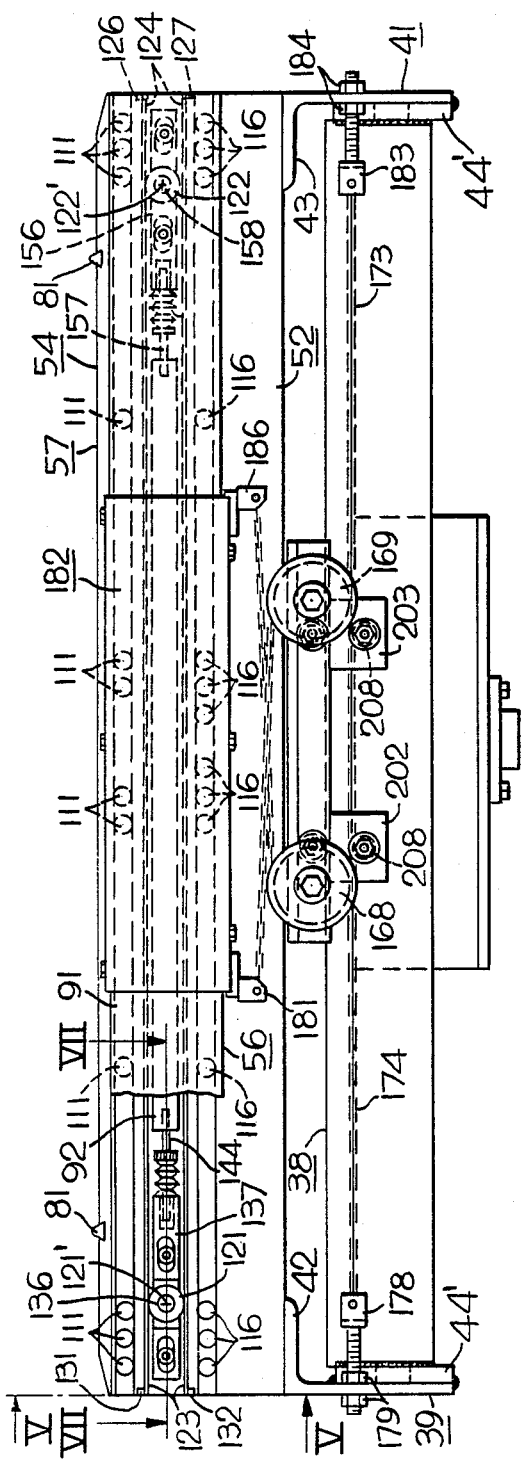
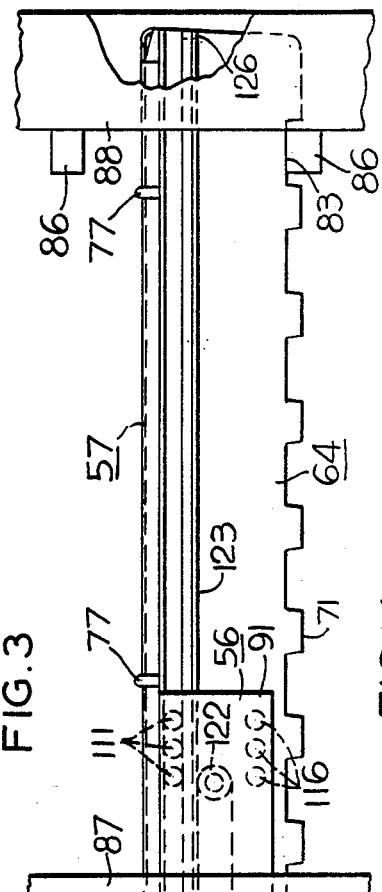
FIG. 3
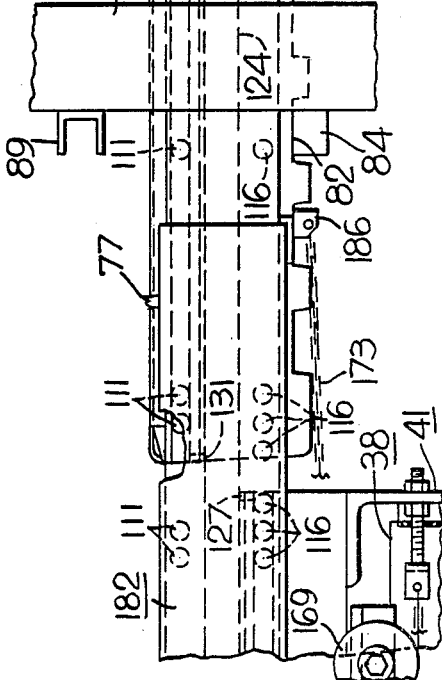
FIG. 4

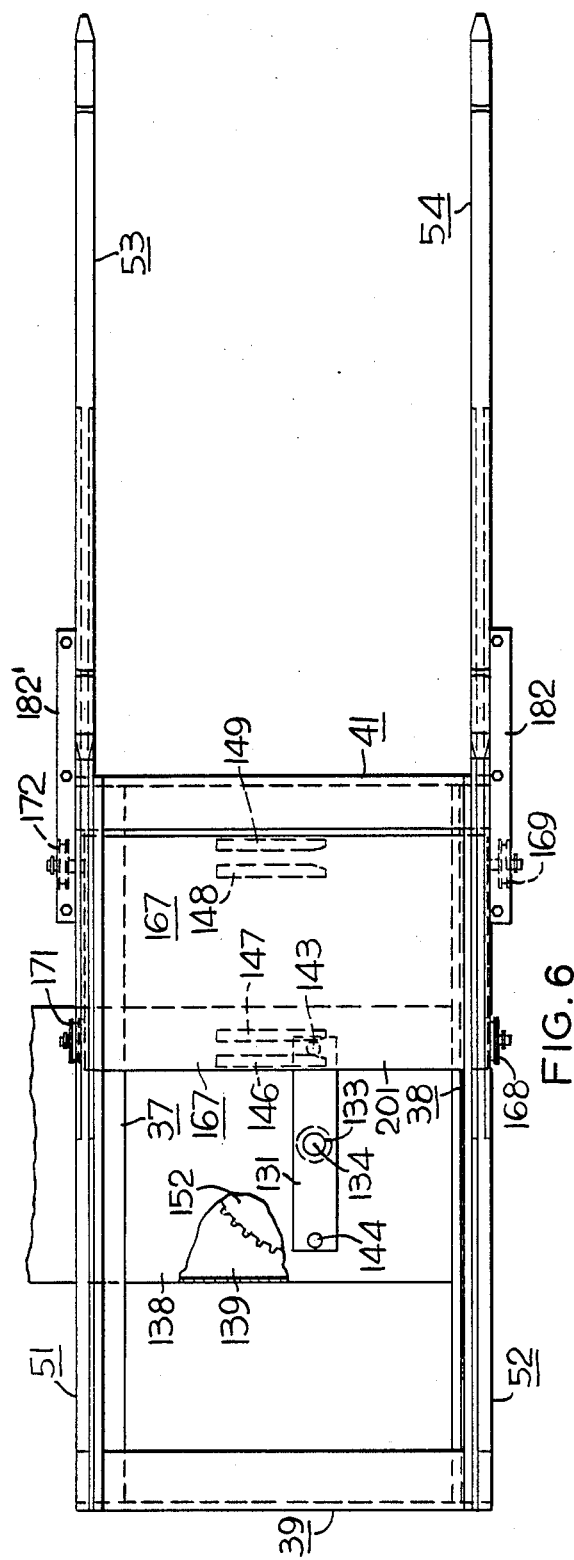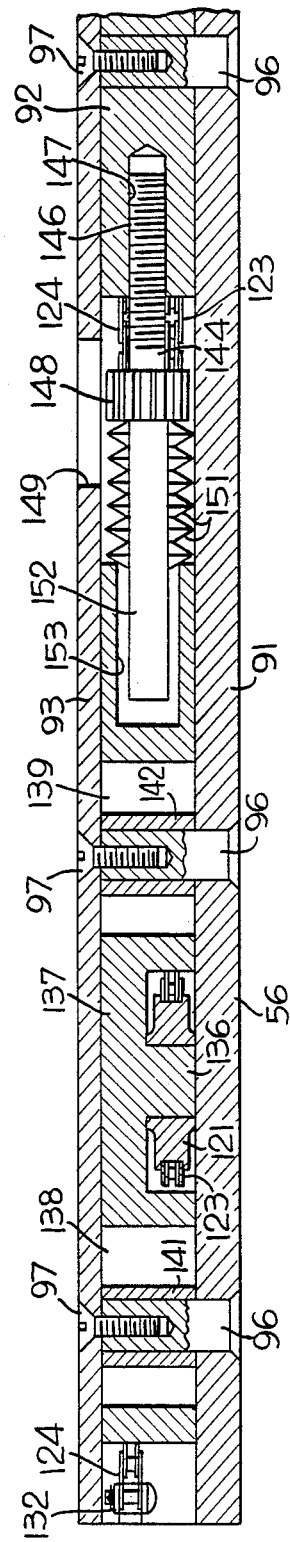
FIG. 6
FIG. 7

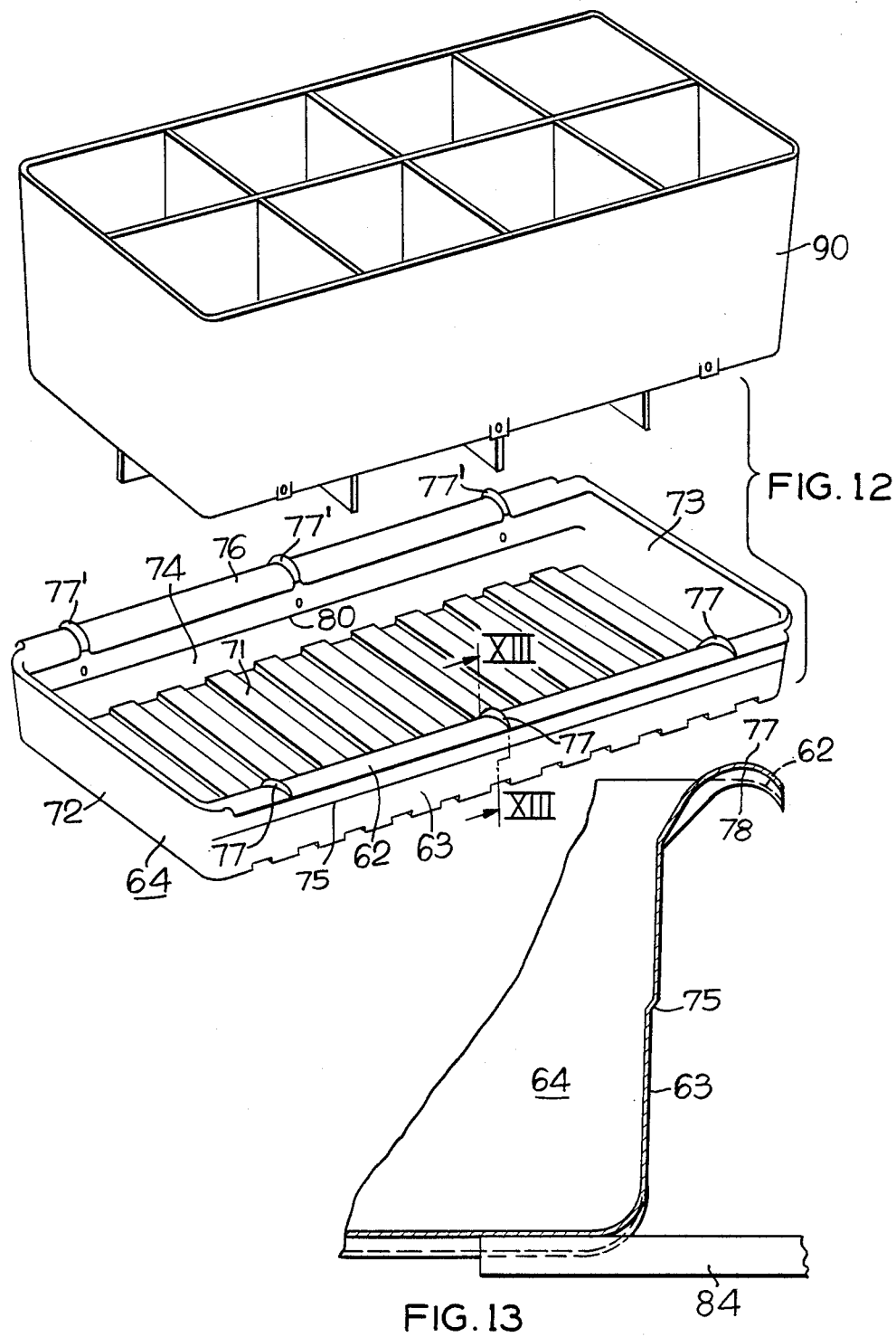

TOTE PAN AND WAREHOUSE RACK STRUCTURE THEREFOR

BACKGROUND OF THE INVENTION

1. Technical Field

This invention relates to automated warehouse systems and more particularly to a tote pan and rack structure for a small parts or mini-load storage and retrieval system.

2. Information Disclosure Statement

Heretofore others have devised small parts or mini-load warehousing systems wherein tote pans are slid into and out of rack compartments at opposite sides of an aisle by an extractor mechanism. Some such systems are disclosed in U.S. Pat. No. 3,809,259 issued May 7, 1974 to George R. Pipes; U.S. Pat. No. 3,883,008 issued May 13, 1975 to John A. Castaldi and U.S. Pat. No. 4,010,855 issued Mar. 8, 1977 to Joseph F. Smith wherein an extractor mechanism on a crane carriage has a finger engagable with a lip or bracket at the lower front portion of the tote pan to slide it into or out of a rack storage compartment at either side of an aisle. The problem of wear due to sliding the tote pan has been recognized and alleviated to some extent by material selection and provision of replaceable wear strips such as nylon strips 42 in before mentioned U.S. Pat. No. 3,809,259.

In the portable tray cart shown in U.S. Pat. No. 3,721,349, downward projections on the tray rim cooperate with notches in support rails on the portable cart to releasably retain the tray in place on the cart. A rimmed storage pan is shown in U.S. Pat. No. 3,448,870 issued June 10, 1969 to J. R. Gallo et al. A tote pan with reverse bend lips with apertures cooperating with vertical projections on lift forks of a lift truck is illustrated and described in U.S. Pat. No. 3,918,600 issued Nov. 11, 1975 to G. T. Lyon. A relatively open storage rack is shown in U.S. Pat. No. 2,894,641 issued July 14, 1959 to L. E. Edwards, Jr. wherein pallets are supported on rails supported on vertical supports reinforced by horizontally disposed channels.

BRIEF SUMMARY OF THE INVENTION

The warehouse using this invention has an aisle with storage racks at opposite sides thereof with a plurality of vertically disposed uprights spaced at predetermined intervals in a first vertical plane adjacent the aisle and a plurality of vertically disposed uprights spaced at corresponding predetermined intervals in a second vertical plane parallel to the first plane and spaced a predetermined distance therefrom in the direction away from the aisle. Cantilever pan support brackets are rigidly secured at predetermined vertical intervals to the uprights. Brackets at the same level on adjacent uprights in each plane extend toward one another and parallel to the aisle. The brackets serve to define storage compartments for tote pans whose bottoms have downwardly facing recesses registerable with the brackets on adjacent uprights.

A single piece tote pan used in an automated warehouse such as hereinbefore described would include a pair of spaced upright end walls, a pair of spaced upright side walls at right angles to the end walls including lips extending outwardly from the side walls to define a pair of parallel lift edges at opposite sides of the pan and a corrugated bottom wall presenting downwardly facing recesses extending the full width thereof transverse to the side walls.

Preferably, the lips extend horizontally along the side of each of the opposite side walls, curving outwardly from the pan to define a pair of parallel inverted arcuate troughs. A plurality of parallel raised ribs may be formed in the lips at spaced intervals therealong, the ribs extending transverse to the side walls and defining downwardly opening pockets. The ribs reinforce the lips and are adapted to receive vertical projections on lift arms when the latter are placed in lifting relation to the lips.

BRIEF DESCRIPTION OF THE DRAWINGS

The present invention is illustrated in the drawings in which:

FIG. 3 is a front view of the extractor with the extractor arms in a nonextended condition;

FIG. 4 is a partial view of the extractor showing the extractor arms in their extended positions and engaging the undersides of lips on opposite sides of a storage pan;

FIG. 5 is a view taken along the line V—V in FIG. 3;

FIG. 6 is a top view of the extractor with the support arms shown in an extended position and with parts broken away for illustration purposes;

FIG. 7 is a view taken along the line VII—VII in FIG. 3;

FIG. 12 is an exploded pictorial view of a combination of a tote pan and an extender therefor;

FIG. 13 is a view taken along the line XIII—XIII in FIG. 12;

DETAILED DESCRIPTION OF THE DRAWINGS

Figure 1:
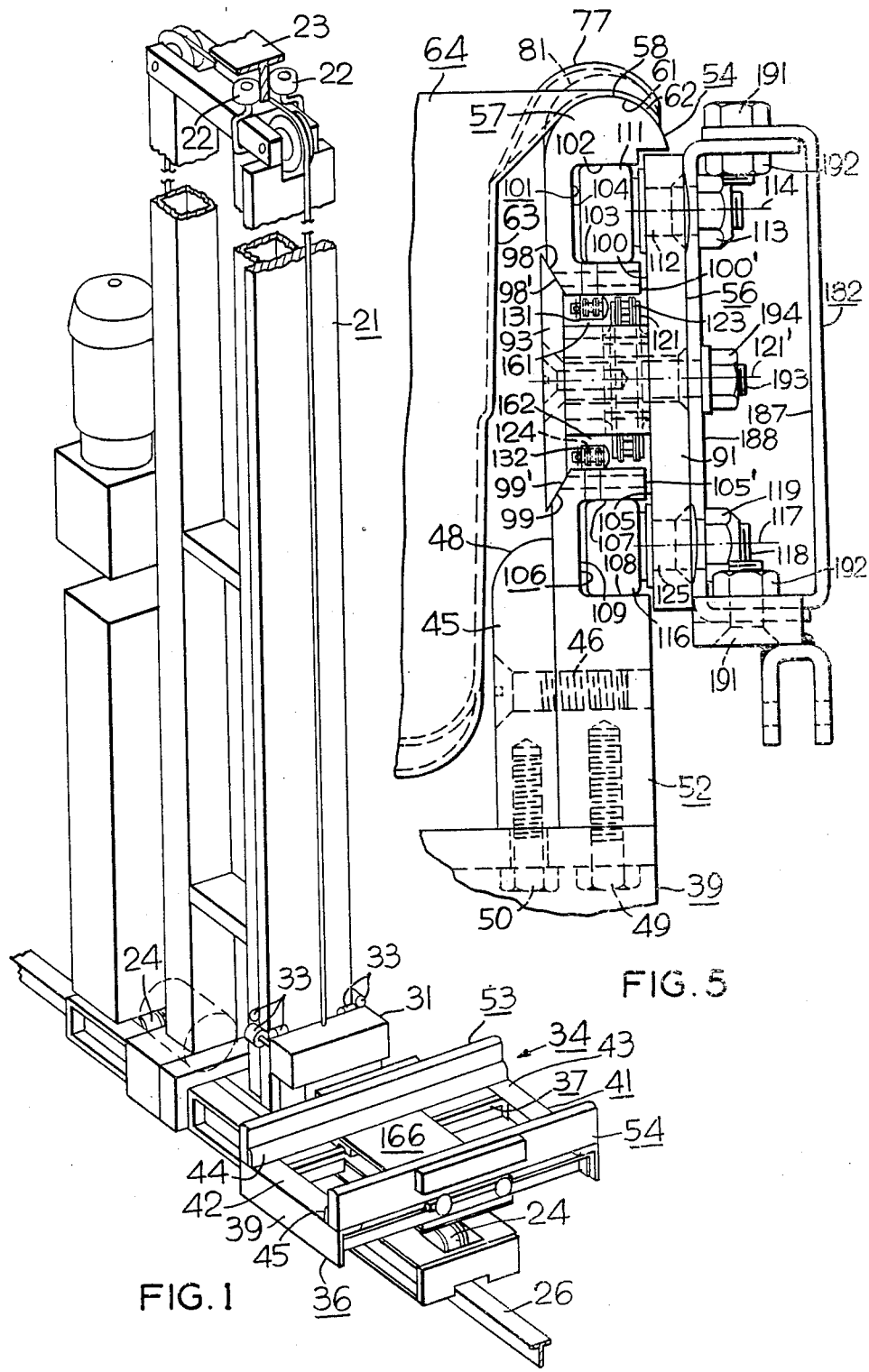
FIG. 1 is a pictorial view of a crane supported for movement along an aisle of an automated warehouse and including a carriage on which an extractor is mounted.
Figure 2:
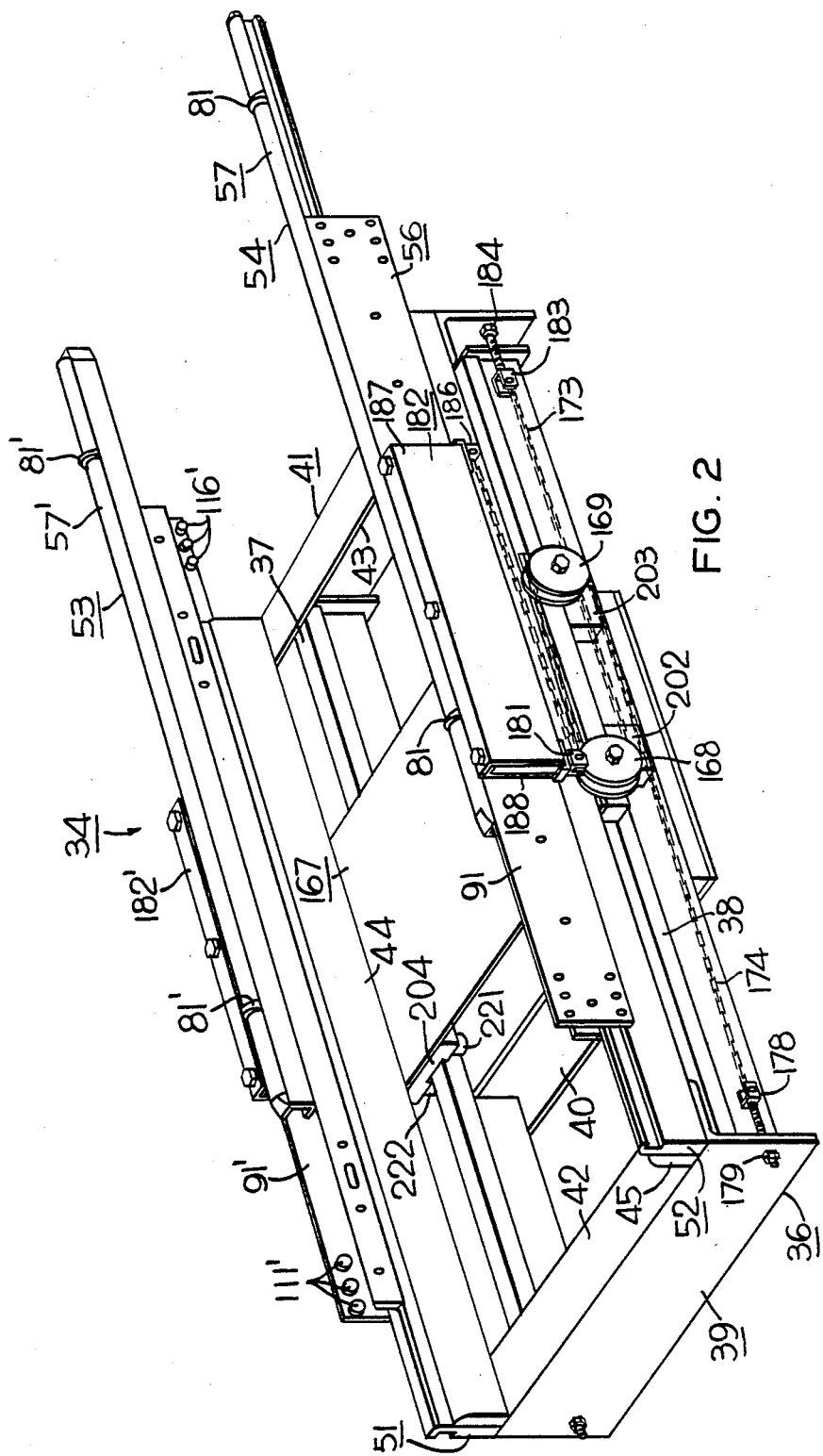
FIG. 2 is a pictorial view of the extractor shown in FIG. 1 but wherein the extractor arms are partially extended.
Figure 8:
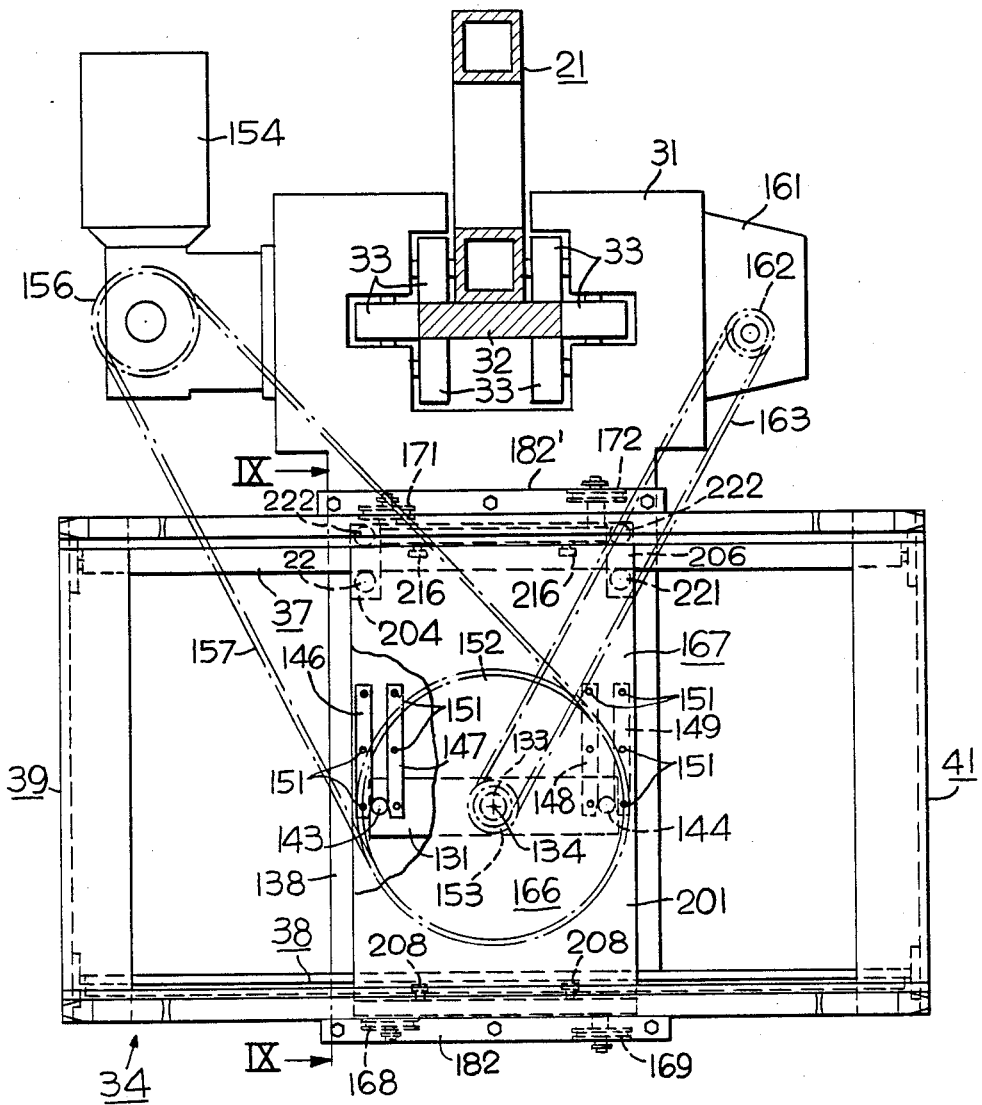
FIG. 8 is a top view of the carriage and extractor.
Figure 10:
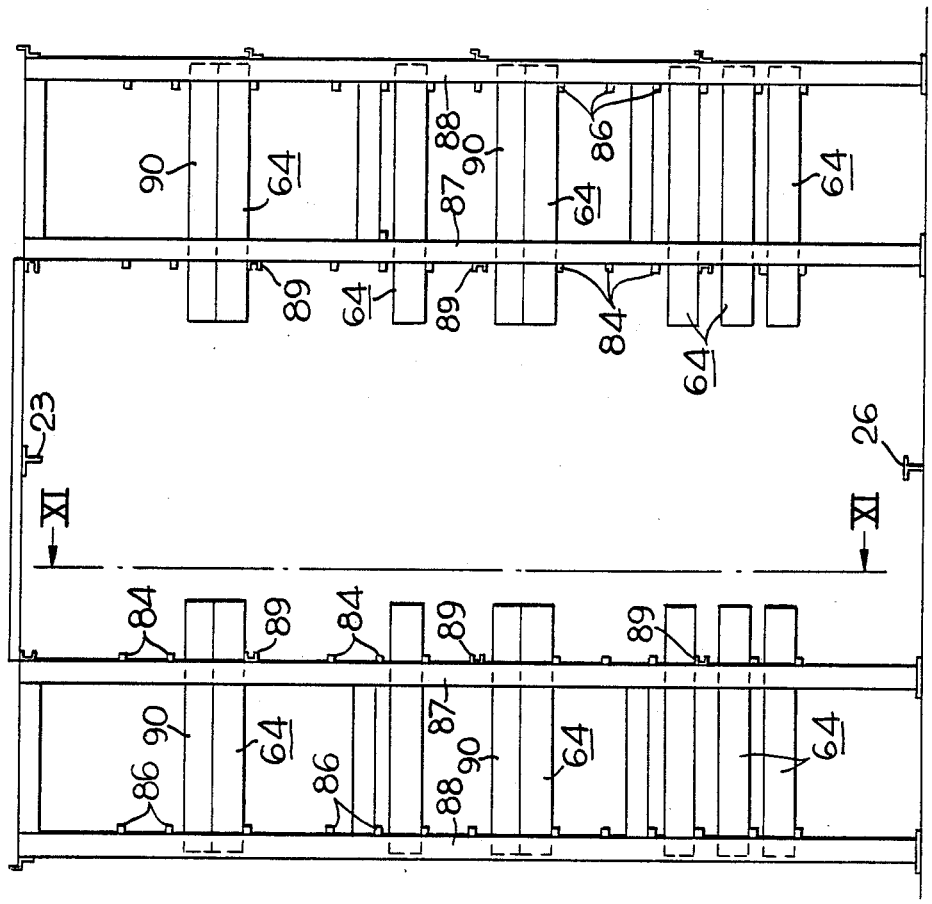
FIG. 10 is an end view of an aisle of a warehouse in which the crane of FIG. 1 operates.
Figure 11:
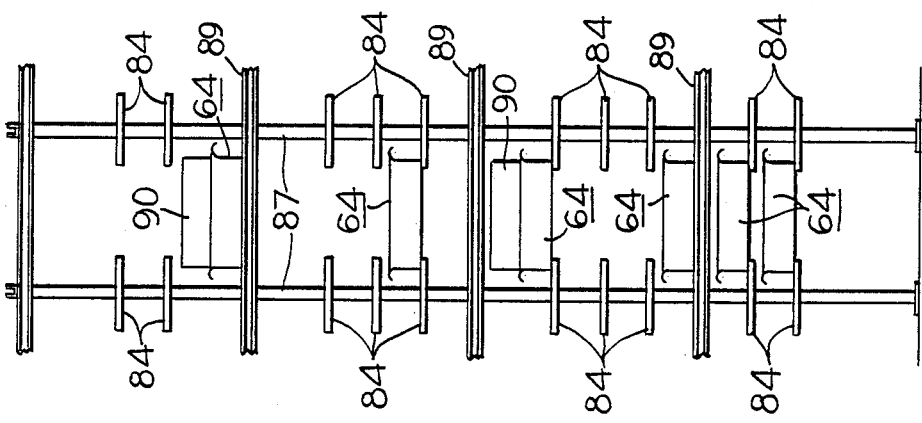
FIG. 11 is a view taken on the line XI—XI in FIG. 10.

Referring to the drawings, a small parts warehousing system of the present invention may utilize an automatic storage and retrieval vehicle such as the illustrated computer controlled crane 21 which carries suitable rollers 22 at the top thereof for engaging an overhead track 23 and a pair of double flanged wheels 24 vertically engaging a bottom track 26 in the aisle of a warehouse, as illustrated in FIGS. 10 and 11. As illustrated in FIGS. 1 and 8, a carriage 31 is reciprocatingly mounted on a mast 32 of the crane 21 by a plurality of rollers 33. The carriage 31, which is raised and lowered on the mast 32 by a cable 30, carries an extractor 34 having a support structure 36 rigidly secured to and extending horizontally forward from the carriage 31. The support structure 36 includes a pair of horizontal parallel tracks 37, 38 rigidly secured, as by welding, to a longitudinal box frame 40 of the support structure 36 and extending in transverse relation to the aisle terminating in mounting pads 44' welded to their ends. The mounting pads 44' are in turn welded to the upright flanges of a pair of angles 39, 41 at transversely opposite sides of the extractor. Horizontal flanges 42, 43 of the angles 39, 41 are in supporting relation to a pair of parallel base rails 51, 52 of a pair of extensible and retractable extractor arms or arm structures 53, 54. The rails 51, 52 have reinforcing bars 44, 45 secured to their inner sides by screws 46. The reinforcing bars 44, 45 have upwardly diverging surfaces 47, 48 to assist in guiding a tote pan into proper supported position on the arms 53, 54 should any misalignment occur. The rails 51, 52 and their reinforcing bars 44, 45 are rigidly secured to the flanges 42, 43 by cap screws 49, 50.

Referring to FIGS. 2 through 9, the arm structures 53, 54 are disposed in parallel relation to one another and at substantially the same elevation. The arm structures 53, 54 are relatively narrow in the longitudinal direction of the aisle and reciprocate horizontally in transverse relation to the aisle between a nonextended or nested position, as shown in FIGS. 1 and 3, and an extended position into a rack storage compartment at one side of the aisle as illustrated in FIG. 4. Referring specifically to the arm structure 54, the base rail 52 supports an intermediate rail 56 which in turn supports a pan support rail 57 disposed vertically above and spaced from base rail 52. The pan support rail 57 has an upward facing convex surface 58 which is complementary to and adapted to engage the downwardly facing concave underside surface 61 of a lip 62 extending along a side or side wall 63 of a tote pan 64. The lip 62 forms part of the top rim of the pan 64 and extends substantially coextensively along the length of the side wall 63, which side is disposed transverse to the aisle when it is in a storage compartment in the racks at one of the opposite sides of the aisle and also when the pan is transported by the crane 21.

The pan 64, as illustrated in FIGS. 4, 5, 9, 12 and 13, is molded in a single piece whereby its bottom 71 is integral with its end walls 72, 73 and side walls 63, 74. The lips 62, 76 flare outwardly from the upper end of the side walls 63, 74 and include raised ribs 77, 77' presenting downwardly facing cavities or pockets 78, 78'. Two of the downwardly open pockets 78, 78' on each lip register with upwardly extending projections 81, 81', respectively, on the pan support arms 53, 54. The ribs 77, 77' on the pan lips 62, 76 not only serve to provide cavities 78, 78' nesting with the projections 81, 81' to releasably retain the pan 64 on the extractor but also serve as reinforcing structure for the lips 62, 76. While only three ribs are shown on each of the lips, additional reinforcement of the lips is achievable by adding additional ribs at selected points along the length of the lips 62, 76. The side walls 63, 74 of the pan 64 are strengthened by shoulders 75, 80 which also serve as support ledges when the pans are stacked one within the other.

The pan bottom 71 has a corrugated configuration with the alternate ridges and grooves extending parallel to the end walls 72, 73 and in transverse relation to the side walls 63, 74 and the lips 62, 76. The corrugated configurations provides a strong bottom having low deflection, as compared to a flat bottom of the same thickness of material. As shown in FIG. 4, two of the downward facing recesses 82, 83 in the pan bottom register with and engage front and rear support brackets 84, 86 on the rack uprights 87, 88 to releasably lock the pan in its stored position in a storage compartment defined by the vertical spacing of the support brackets. As also shown in FIG. 11, the brackets 84, 86 are horizontal bars welded at an intermediate portion thereof to the uprights. Cantilevered ends of the bars extend parallel to the aisle a relatively short distance toward the adjacent upright. In those instances where longitudinal braces 89 extend between the aisle uprights 87, the braces serve to support the tote pan thus replacing the support brackets 84.

As shown in FIG. 12, an extender 90 may be inserted in and secured to the pan to provide a plurality of storage cells in a single pan. The extender 90 increases the volumetric capacity of the pan thus making it particularly suited to storing a plurality of segregated lightweight items.

The intermediate rail 56 of the extensible arm 52 includes an upright plate or beam 91 which is relatively narrow in the horizontal direction of the aisle, that is, in the fore and aft direction. The beam 91 has upper and lower portions in juxtaposed, lapped relation to the pan support rail 57 and the base rail 52. In the nested or nonextended condition of the extractor, as shown in FIGS. 1, 3 and 8, the rails 52, 56, 57 are coextensive with the support 36. As shown in FIG. 7, the intermediate rail 56 includes a spacer bar part 92 sandwiched between and secured to the beam 91 and a guide plate 93 by releasable fastening means in the form of bolts 96 and flat head screws 97 in threaded engagement with drilled and tapped openings in the bolts 96. In order to maintain an aligned relationship of the rails 57, 56, 52, the plate 93 presents guide parts or tapered slide or bearing surfaces 98, 99 in horizontal thrust transmitting relation to confronting and complementary slide surfaces 98', 99', on the pan support rail 57 and base rail 52; and the upper and lower portions of the beam 91 present flat vertical surfaces 100, 105 in horizontal thrust transmitting relation to flat vertical confronting slide surfaces 100', 105' on the pan support and base rails 57, 52.

Figure 9:
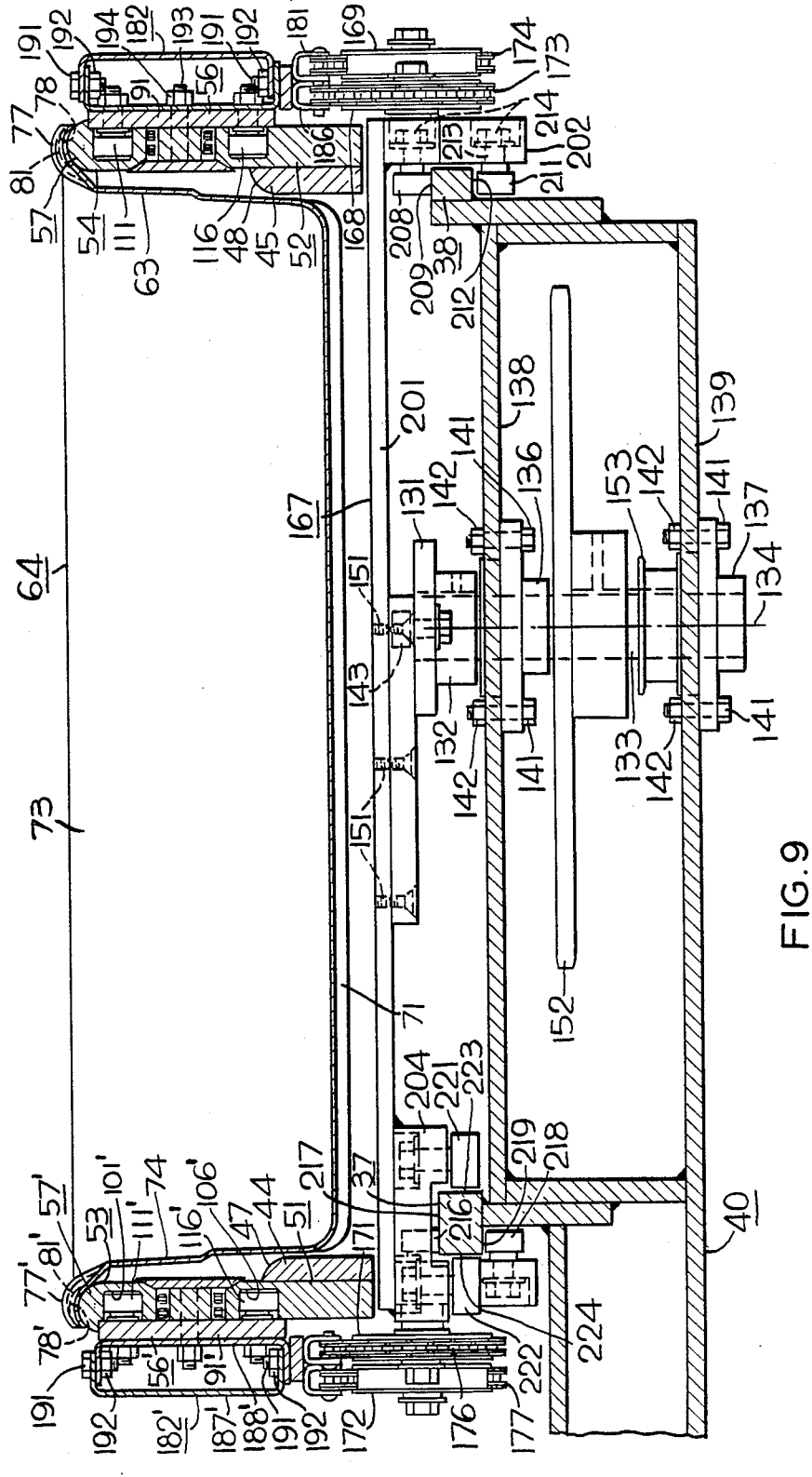
FIG. 9 is a view taken along the line IX—IX in FIG. 8.

Referring also to FIGS. 3, 5 and 9, the pan support rail 57 includes wall means defining a horizontal groove 101 having upper and lower horizontal bearing surfaces 102, 103 vertically facing one another and a vertical interior surface 104 facing in a forward horizontal direction. The base rail 52 includes wall means defining a horizontal groove 106 parallel to groove 101 of the pan support rail 57 which presents upper and lower horizontal bearing surfaces 107, 108 in vertical facing relation to one another and a vertical interior surface 109 facing horizontally forward. Thus, both grooves 101 and 106 are open in the forward direction of movement of the crane 21. A plurality of upper rollers 111 are rotatably mounted on axles 112, and 120 which are secured to the upper portion or part of the beam 91 for rotation about the parallel horizontal axes 114 of the axles 112 extending in the horizontal direction of the aisle traversed by the crane 21. The upper rollers 111 are operatively disposed within the groove 101 and are in rolling, vertical load bearing engagement with the bearing surfaces 102, 103 of the pan support rail 57 thus serving to support the latter as it is horizontally reciprocated relative to the intermediate rail 56. The intermediate rail 56 rotatably carries lower rollers 116 on horizontally spaced parallel axes 117, such rollers being in rolling vertical load bearing engagement with the upper and lower bearing surfaces 107, 108 of the groove 106 of the base rail 52 whereby the intermediate rail 56 is vertically supported on the base rail 52. The lower rollers 116 are rotatably mounted on a lower part of the beam by axles 118 and 125 mounted on the beam 91. Rollers 111' and 116' are similarly mounted on an intermediate rail 56' of extensible arm 53 and cooperate with grooves 101' and 106' in a pan support rail 57' and the base rail 51. The axles 112 and 118 for the rollers 111, 111', 116, 116' on the portion of the beams adjacent the reinforcing structures 182, 182' are threaded to receive nuts 113, 119. The other axles 120, 125 are riveted to the beams 91, 91'.

The pan support arm 57 is caused to move lengthwise relative to the intermediate rail 56 by a chain and pulley mechanism including a pair of pulleys 121, 122 rotatably mounted on opposite end portions of the intermediate rail 56 on horizontal, parallel axes 121', 122' extending transverse to the direction of movement of the intermediate rail 56 and a pair of flexible motion transmitting elements in the form of chains 123, 124 having intermediate portions reeved, respectively, about the pulleys 121, 122. The opposite ends of the chain 123 are secured to corresponding ends of the pan support rail 57 and the base rail 52 at one side of the extractor by anchors 126, 127, respectively, and the opposite ends of the chain 124 are secured to corresponding ends of the pan support rail 57 and the base rail 52 at the opposite side of the extractor by a pair of anchors 131, 132, respectively.

As illustrated in FIGS. 3, 5 and 7, the pulley 121 is rotatably mounted on stub shaft 136 formed on a slide member 137 with the free end of the shaft 136 confronting the inner side of the beam 91. The slide member 137 includes a pair of aligned longitudinal slots 138, 139 in sliding engagement with a pair of spacer bushings 141, 142 through which a pair of bolts 96 extend. Thus, the spacer bushings 141, 142 serve to guide the lengthwise movement of the slide member 137 and to space the beam 91 and plate 93 of the intermediate rail 56 relative to one another. The pulley 121 and the slide member 137 on which it is mounted may be adjusted in the lengthwise direction of the intermediate rail 56 by turning an adjustment member in the form of a screw 144. The adjustment screw 144 includes a threaded portion 146 on one end in threaded engagement with a drilled and tapped opening 147 in the spacer bar part 92 of the intermediate rail 56. An exteriorly splined wheel 148 integrally formed on the screw 144 intermediate its length can be turned by the prying action of a screwdriver, or other prying tool, inserted through an elongated access opening 149 in the guide plate 93. Biasing means in the form of belleville washers 151 are interposed between the wheel 148 of the screw 144 and the end of the slide member 137 with an end 152 of the screw extending loosely into an aligned bore 153 in the slide member 137. As shown in FIG. 3, a slide member 156, similar to the slide member 137, and an adjusting screw 157 are provided for pulley 122 at the other end of the intermediate rail 56. The slide member 156 is positioned so the free end of its stub shaft 158 is in confronting relation to the guide plate 93, thereby placing the pulley 122 adjacent the plate 93. The offset positioning of the pulleys 121, 122 and the chain anchors place the chains 123, 124 in side-by-side relation to one another without interference. As shown in FIGS. 5, 7 and 9, the chains 123, 124 extend through upper and lower passageways 161, 162 between the bottom of the pan support rail 57 and the central spacer part 92 and between the latter and the top of the base rail 52. In the nonextended condition of the extractor, the pan support rail 57 can be centered on (made transversely coextensive with) the intermediate rail 56, when the latter is centered on the base rail, by turning the adjusting screws 144, 157. The screws 144, 157 may also be turned to adjust the tension of the chains 123, 124.

A similar chain and pulley arrangement is provided for the extractor arm 53 to effect shifting movement of pan support rail 57'.

Referring to FIGS. 1, 2, 3, 4, 5, 6, 8 and 9, a chain and cable side shift mechanism 166 is provided for lengthwise extension of the intermediate rail 56 relative to the base rail 52, which movement is transverse to the aisle in which the crane 21 is operating. The side shift mechanism 166 includes a shuttle 167 reciprocatingly mounted on the tracks 37, 38 and rotatably carrying pulleys 168, 169 on its front end and pulleys 171, 172 on its rear or aft end. The side shift mechanism 166 also includes chains 173, 174 reeved about the pulleys 168, 169, respectively, and chains 176, 177 reeved about the pulleys 171, 172, respectively. One end of chain 174 is connected to a threaded fastener 178 which in turn is adjustably connected to the channel 39 at one side of the extractor by nuts 179. The other end of the chain 174 is secured by a fastener 181 to one end of a beam reinforcing structure 182 which is secured to the outer side of the beam 91 and extends along only an intermediate portion of the beam 91. One end of the chain 173 is adjustably connected to the channel 41 by a threaded fastener 183 and nuts 184 and the other end of the chain 173 is secured by a fastener 186 to the other end of the reinforcing structure 182. The chains 176, 177 are similarly fastened at the aft end of the extractor. The reinforcing structure 182 is made up of two channels 187, 188 with lapped flanges secured by bolts 191 and nuts 192. The channel 188 is secured to the beam 91, the spacer bar 92 and the guide plate 93 by bolts 193 and nuts 194. The channel 188 is also secured to the beam 91 by the threaded axles 112, 118 and nuts 113, 119. A reinforcing structure 182' includes channels 187', 188' interconnected by bolts 191 and nuts 192 with channel 188' being rigidly secured to the beam 91'. The reinforcing structures 182, 182' serve to reinforce the intermediate rails 56, 56' and their opposite ends serve as anchor points for the ends of chains 173, 174 and 176, 177. When the extractor is extended into a storage compartment for pan depositing or pan retrieval purposes as illustrated in FIG. 4, the end of the reinforcing structure 182 confronts but stops short of the rack upright 87.

The shuttle 167 includes a flat plate 201 to which downwardly extending roller supporting brackets 202, 203, 204, 206 are rigidly secured as by welding. Each of the transversely spaced brackets 202, 203 at the front end of the plate 201 includes an upper guide component in the form of a roller 208 in downward rolling thrust transmitting engagement with the top, upward facing horizontal surface 209 of the track 38 and a bottom guide component in the form of a roller 211 in upward confronting relation to a downward facing horizontal surface 212 on the underside of the track 38. The rollers 208, 211 are identical and have threaded stub shafts 213, which are disposed on parallel horizontal axes and are secured to the brackets 202, 203 by nuts 214. The transversely spaced brackets 204, 206 at the rear end of the plate 201 are reverse images of one another and each rotatably support an upper guide component or roller 216 in vertical thrust transmitting relation and rolling engagement with an upward facing horizontal surface 217 on the top of the track 37 and a bottom guide component or roller 218 in upward thrust transmitting relation to a downward facing horizontal surface 219 on the underside of the track 37. The brackets 204, 206 also rotatably support fore and aft guide components in the form of horizontal thrust transmitting rollers 221, 222 in horizontal confronting relation to parallel vertical surfaces 223, 224 on the fore and aft sides of the track 37. The upper and lower guide components or rollers 216, 218 guide the shuttle horizontally on the track 37 preventing relative vertical displacement between the plate 201 and the track 37 and the upper and lower guide components or rollers 208, 211 guide the shuttle transversely to the fore and aft direction of movement of the crane to prevent relative displacement between the plate 201 and the track 37 in the fore and aft direction of the aisle. Thus, the rollers 216, 218, 221, 222 guide the shuttle 167 horizontally and transversely on the bearing surfaces 217, 219, 223, 224 of the rear track 37 and the shuttle 167 is guided only horizontally on the front track 38 since fore and aft guide rollers are not provided at the front track 38.

Side shift movement of the shuttle 167 on its tracks 37, 38 is effected by power operated means including a harmonic extractor drive which includes a driver lever 131 whose central hub 132 is nonrotatably secured to a vertical shaft 133 rotatably mounted on the support structure 40 of the carriage 31 on a vertical axis 134 by flange bearings 136, 137 bolted to the top and bottom plates 138, 139 of the support structure 40 by bolts 141 and nuts 142. The driver lever 131 carries a pair of horizontal thrust transmitting elements in the form of rollers 143, 144 rotatably mounted on vertical axes on the upper outer opposite ends of the lever 131 at equal distances (radii) from the axis 134. In the retracted condition of the extractor as shown in FIGS. 8 and 9, the rollers 143, 144 are disposed in the forward ends of the fore and aft extending and downwardly open grooves defined by the parallel and transversely spaced cam bars 146, 147, 148, 149 rigidly secured to the underside of the plate 201 by screws 151. The cam bars 146, 147, 148, 149 are tapered slightly at their front ends to provide a flared opening at the front end of each groove to facilitate entrance and exit of the rollers 143, 144 from the grooves formed by the cam bars 146–149. A large diameter sprocket 152 and a small diameter sprocket 153 are nonrotatably secured to the vertical shaft 133. The large diameter sprocket 152 is connected in driven relation to a reversible electric motor 154 by an output or drive sprocket 156 driven by the motor 154 mounted on the carriage 31 and an endless drive chain 157 operatively reeved about sprockets 156 and 152.

OPERATION

When the shaft 133 is rotated clockwise 180° about its vertical axis 134, as viewed in FIG. 8, the roller 143 will bear against cam bar 147 causing the shuttle to move transversely on the tracks 37, 38 to the position shown in FIG. 6 wherein the arms 53, 54 are fully extended at one side of the aisle. At this point the motor is automatically stopped by a control 161 mounted on the carriage 31 which includes a sprocket 162 operatively connected to the shaft 133 by a timing chain 163 which is reeved about the sprockets 162 and 153, as is illustrated in FIG. 8. When the shaft 133 is rotated 180° in the opposite direction from its transport position shown in FIG. 8, the shuttle 167 will be shifted in the opposite transverse direction to fully extend the pan support arms 53, 54 into a storage compartment at the opposite side of the aisle.

For every inch the shuttle 167 moves on the tracks 37, 38, the intermediate rails 56, 56' will simultaneously move two inches, and the pan support rails 56, 56' will move four inches in the same direction as the shuttle moves.

When extracting a pan 64 from a storage compartment in a rack structure, the crane and carriage are positioned so that upon extension of the arms 53, 54 they will be beneath the lips of the selected pan. Upon raising the carriage 31 a short distance, the rails 56, 56' of the arms 54, 53 will engage the underside of the lips 62, 76 and the pan will be raised from the support bars 84 a sufficient distance so that the pan bottom will clear the support bars 84 during retraction of the arms and pan from the storage compartment. Registration of the rib cavities 78, 78' with the projections 81, 81' prevents relative movement between the pan 64 and the pan support rails 56, 56' during a storage or extraction operation or during transport of the pan by the crane.

ALTERNATE CONSTRUCTIONS

The alternate tote pan 301 shown in FIGS. 14–18 is a one piece metal stamping and is similar in construction to that illustrated in FIGS. 12 and 13. The side wall 304 of the pan 301 includes offset portions 302, 303 forming a shoulder 306 at their juncture near the mid-portions of the wall 304. A similar shoulder 307 is formed in side wall 308. The shoulders extend horizontally the length of the side walls 304, 308 and around the rounded corners joining the side walls to the end walls 309, 310 as at the curved segments 311, 312, 313, 314 of the opposite ends of the shoulders 306, 307. The shoulders 306, 307 serve to aid in stacking the tote pans and serve to greatly reinforce and stiffen the side walls and the rounded courners, thereby helping the pan to retain its shape in a loaded condition. The corrugated construction of the bottom 316 also serves to strengthen and stiffen the pan—particularly the bottom. The recesses 317 and ridges 318 extend transverse to the side walls 304, 308 and across the full width of the bottom 316 with two of the recesses registering with support brackets such as bracket 84 shown in FIG. 15 or bracket 351 shown in FIGS. 19 and 20. The recesses 317 and ridges 318 have the same width which is 6 to 8 times the depth of height (vertical dimension) of the recesses and ridges. Preferably the recesses are at least 4 times as wide as they are deep.

Horizontally extending lift ledges in the form of lips 321, 322 are formed at the top of the pan side walls 304, 308. The lips 321, 322 are arcuate and curve outwardly from the pan to define a pair of parallel inverted arcuate troughs, the trough 323 formed by the lip 321 being shown in FIGS. 15, 16 and 18. A plurality of raised or upwardly projecting reinforcing ribs 326 are formed on the lips to present downwardly opening recesses or pockets 330. A pair of the recesses near opposite ends of each lip register with upward projections 81, 81' on the extractor pan support rails 57, 57' so as to releasably retain the pan in its desired carry position on the extractor. The ribs 326 greatly increase the strength of the lip and for that reason more ribs are used than are actually required for registration with the pan support rail projections 81, 81'.

Figures 17, 18:
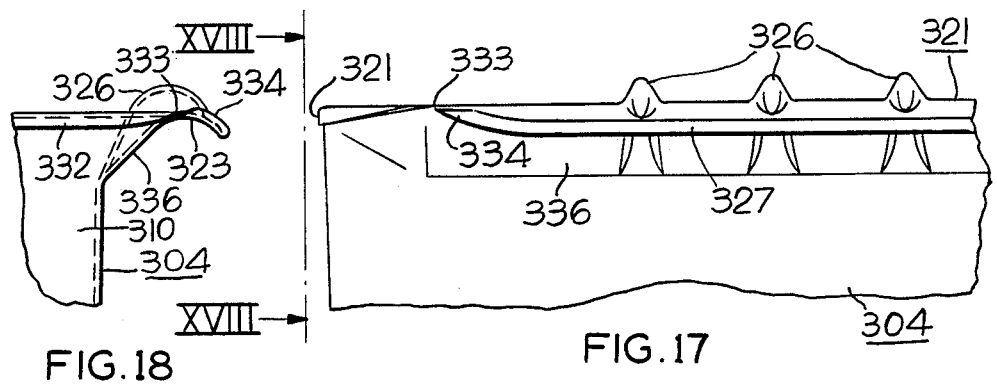
FIG. 17 is a partial side view of the pan shown in FIG. 14.
FIG. 18 is a view taken along the line XVIII—XVIII in FIG. 17.
Figure 14:
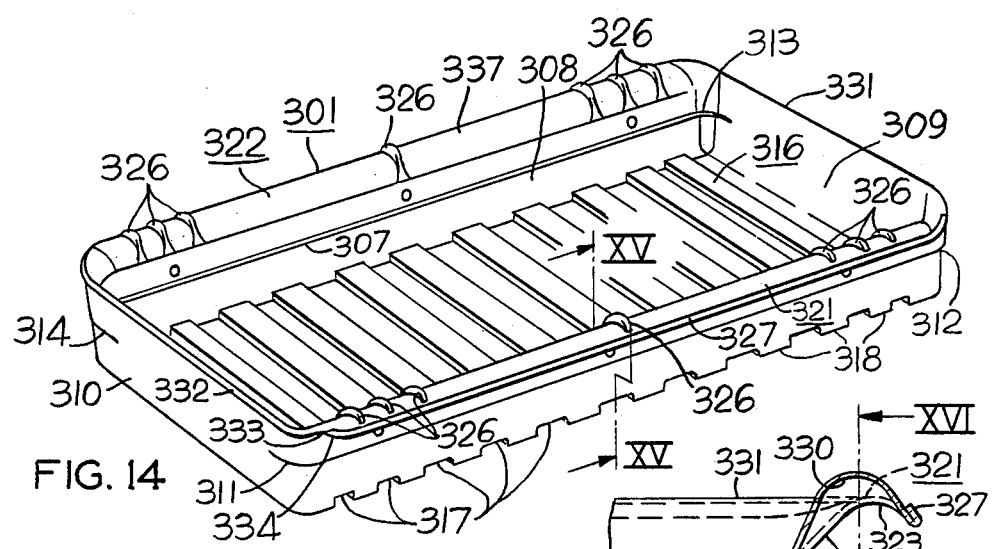
FIG. 14 is a pictorial view of an alternate construction for the tote pan.
Figure 16:
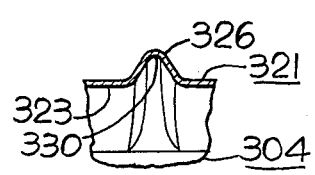
FIG. 16 is a view taken along the line XVI—XVI in FIG. 15.
Figure 15:
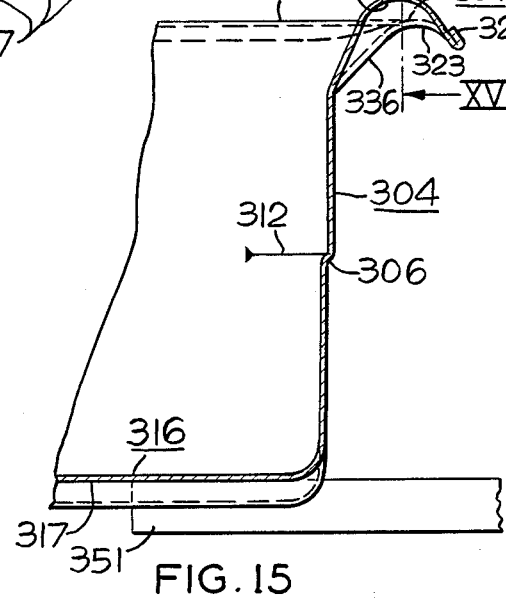
FIG. 15 is a view taken along the line XV—XV in FIG. 14.

As shown in FIGS. 14, 15, 17 and 18, the outer edge 327 of the lip 321 has been subjected to a reverse bend thereby folding the metal to a double thickness at the free extremity of the lip. Lip 322 is similarly formed. This adds considerable strength and stiffness to the edge of the lips 321, 322. The reverse bend is facilitated by the ribs 326 terminating short of the outer edges of the lips. The upper edges 331, 332 of the end walls 309, 310 are formed by a 180° bend in the metal with the free ends extending downwardly a relatively short distance. In order to avoid closing off the reverse troughs of the lips 304, 308 at their longitudinal ends near the pan end walls 309, 310, the lips terminate at the commencement of the rounded corners and the extremities of the lips are curved upwardly. As shown in FIGS. 14, 17 and 18, lip 321 terminates at its longitudinal end 333. It will be noted that the turned over or reverse folded edge 327 includes a short curved segment 334 which curves upwardly adjacent the end 333. The end view in FIG. 18 clearly shows how the edge of lip 321 and the edge 332 at their juncture point 333 are bent upward to avoid blocking the end of the trough 323, thus avoiding possible interference with insertion and retraction of the extensible arms of the extractor 34.

It will also be noted the pan side walls 304, 308 include a tapered portion 336, 337 extending upwardly and outwardly at an angle of approximately 45° to the side walls 304, 308 with the transverse, parallel ribs 326 terminating at the lower edge of the tapered portions 336, 337. This configuration provides a very strong lip for tote pan lifting purposes and the tapered portions 336, 337 serve to cam the pan to proper lift position on the extractor arms, should misalignment be present, as the lift arms are raised into engagement with the undersides of the lips 321, 322.

Figure 20:
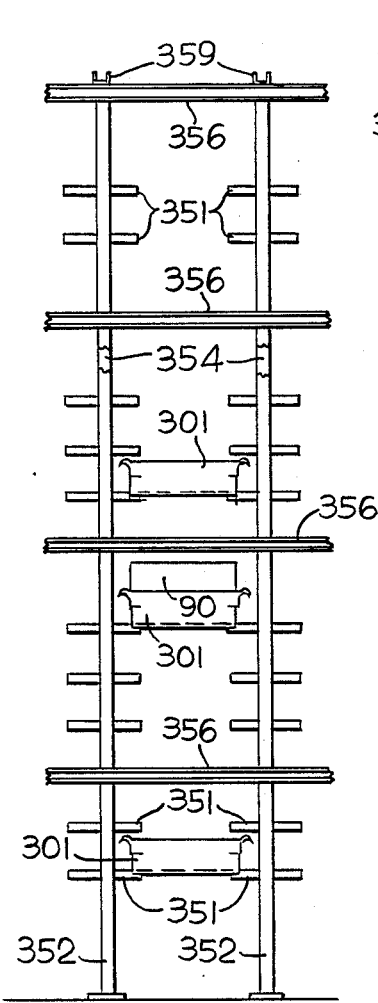
FIG. 20 is a view taken along the line XX—XX in FIG. 19.
Figure 19:
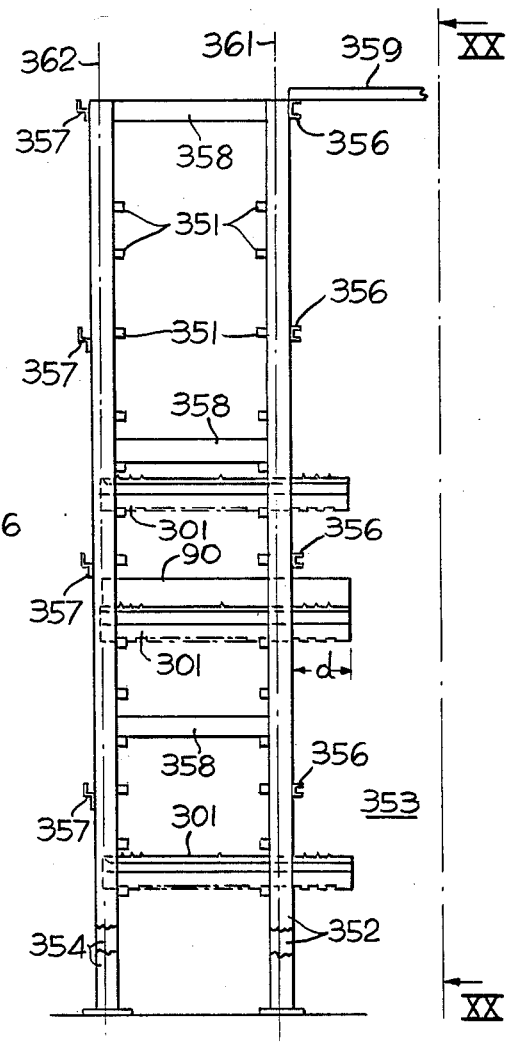
FIG. 19 is an end view of an alternate storage rack structure.

In the rack structure shown in FIGS. 19 and 20, the tote pan support brackets or bars 351 are welded at predetermined vertical intervals to the back sides of the uprights 352 adjacent the aisle 353 and at corresponding vertical intervals to the front sides of the rear uprights 354 remote from the aisle. The front or aisle uprights 352 are reinforced and braced by channels 356 secured at selected intervals to the front sides of the aisle uprights 352. The channels 356 extend horizontally and parallel to the aisle. The rear uprights 354 are reinforced and braced by horizontal braces 357 secured to their back sides. Horizontal braces 358 extend between and are rigidly secured to corresponding front and rear uprights 352, 354 and channel members 359 interconnect the racks structures at opposite sides of the aisle 353. The aisle uprights 352 lie in a plane 361 parallel to and adjacent the aisle 353 and the rear uprights 354 lie in a plane 362 parallel to and spaced from the plane 361 in the direction away from the aisle 353. The cantilever pan supports or brackets 351 on adjacent front uprights and on adjacent rear uprights extend toward one another to define pan compartments and serve to support the tote pans. As shown in FIGS. 19 and 20, one recess in the bottom near the rear of the tote pan 301 registers with an aligned pair of brackets 351 on an adjacent rear pair of uprights 354 and a bottom recess rearwardly from the front of the pan 301 registers with a pair of aligned brackets on an adjacent pair of front uprights 352. One of the pans is shown with a pan extender 90.

It will be noted that the pan 301 extends beyond the front uprights 352 a distance "d" which distance is preferably at least one-sixth the length of the pan 301 measured in the direction transverse to the aisle 353, that is from front to rear in the rack. This permits narrow spacing of the uprights both from front to rear and in the direction of the aisle. The narrow spacing in the direction of the aisle is possible because the reinforcing structures 182, 182' stop short of the front uprights during a pan storage or retrieval operation of the extractor. Thus, space need not be provided for structures 182, 182' to go between the adjacent uprights 352 supporting the pan.

The pan and rack constructions of this invention permit efficient utilization of storage space in the warehouse in which used. The pan is believed capable of carrying heavier loads than customarily handled by mini-load or small parts tote pans. The close spacing of uprights in the warehouse permits reduction in materials used in the warehouse facility per unit weight or volume of material stored thus reducing the cost of storage facilities.

The embodiments of the invention in which an exclusive property or privilege is claimed are defined as follows:

1. A warehouse having an aisle with storage racks at opposite sides thereof, each storage rack including a plurality of vertically disposed uprights spaced at predetermined intervals in a first vertical plane adjacent said aisle and a plurality of vertically disposed uprights spaced at corresponding predetermined intervals in a second vertical plane parallel to said first plane and spaced a predetermined distance therefrom in the direction away from said aisle, cantilever pan support brackets rigidly secured at predetermined vertical intervals to said uprights, said brackets at the same level on adjacent uprights in said planes extending toward one another and parallel to said aisle, said brackets defining storage compartments for and being adapted to support tote pans, and a plurality of tote pans with each tote pan having a bottom presenting downwardly facing recesses registering with a pair of brackets on an adjacent pair of uprights in each of said planes.

2. The warehouse of claim 1 wherein said recesses extend the width of said pan in the direction of said aisle.

3. The warehouse of claim 1 wherein said pan extends horizontally a predetermined distance beyond said adjacent pair of uprights in said first plane into said aisle.

4. The warehouse of claim 3 wherein said predetermined distance is at least one-sixth the length of said pan measured transverse to said aisle.

5. A tote pan for use in automated warehousing systems comprising
a bottom wall;
a pair of spaced upright end walls; and
a pair of spaced side walls at right angles to said end walls including
an arcuate lip extending horizontally along the upper end of each of said side walls, said lips curving outwardly from said pan to define a pair of parallel inverted arcuate troughs along the outer sides of said side walls and
a plurality of raised ribs in said troughs at spaced intervals therealong, said ribs extending transverse to said side walls and defining downwardly opening pockets, said ribs reinforcing said lips and being adapted to receive vertical projections on lift arms when the latter are placed in lifting relation to said lips.

6. The tote pan of claim 5 wherein a shoulder is formed horizontally along the mid-portion of each of said side walls to reinforce the latter and to facilitate stacking tote pans of identical construction.

7. The tote pan of claim 5 wherein said ribs terminate short of the outer edges of said lips and said outer edges are formed by reverse bending of the material of which the lips are formed.

8. The tote pan of claim 5 wherein said pan is formed as a one piece stamping and includes corrugations in said bottom wall serving to strengthen the latter and retain the pan on cooperating supports in a warehouse rack structure.

9. In combination:
a warehouse having an aisle with storage racks at opposite sides thereof, each storage rack including
a plurality of vertically disposed uprights spaced at predetermined intervals in a first vertical plane adjacent said aisle and a plurality of vertically disposed uprights spaced at corresponding predetermined intervals in a second vertical lane parallel to said first lane and spaced a predetermined distance therefrom in the direction away from said aisle and
cantilever pan support brackets rigidly secured at predetermined vertical intervals to said uprights, said brackets at the same level on adjacent uprights in said planes extending toward one another and parallel to said aisle, said brackets defining storage compartments for and being adapted to support tote pans and
a single piece tote pan for use in said warehouse including
a pair fo spaced upright end walls;
a pair of spaced side walls at right angles to said end walls including lips extending outwardly from said side walls to define a pair of parallel lift ledges at opposite sides of said pan; and
a corrugated bottom wall presenting downwardly facing recesses extending the full width of said bottom wall transverse to said opposite sides of said pan, at least one of said recesses being engaged by a pair of said brackets on adjacent uprights of said warehouse storage rack at the same level.

* * * * *